US012776536B2

(12) United States Patent
Park et al.

(10) Patent No.: US 12,776,536 B2
(45) Date of Patent: Oct. 27, 2026

(54) BUTTON-TYPE SECONDARY BATTERY AND METHOD FOR MANUFACTURING THE SAME

(71) Applicant: LG ENERGY SOLUTION, LTD., Seoul (KR)

(72) Inventors: Geun Young Park, Daejeon (KR); Joo Hwan Sung, Daejeon (KR); Yong Gon Lee, Daejeon (KR); Min Su Cho, Daejeon (KR); Min Seon Kim, Daejeon (KR); Yeong Hun Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 789 days.

(21) Appl. No.: 17/920,742

(22) PCT Filed: Aug. 11, 2021

(86) PCT No.: PCT/KR2021/010666
§ 371 (c)(1),
(2) Date: Oct. 21, 2022

(87) PCT Pub. No.: WO2022/035226
PCT Pub. Date: Feb. 17, 2022

(65) Prior Publication Data

US 2023/0170559 A1 Jun. 1, 2023

(30) Foreign Application Priority Data

Aug. 11, 2020 (KR) ........................ 10-2020-0100765
Aug. 5, 2021 (KR) ........................ 10-2021-0103498

(51) Int. Cl.
*H01M 50/153* (2021.01)
*H01M 10/04* (2006.01)
(Continued)

(52) U.S. Cl.
CPC ..... *H01M 50/153* (2021.01); *H01M 10/0427* (2013.01); *H01M 50/109* (2021.01); *H01M 50/167* (2021.01)

(58) Field of Classification Search
None
See application file for complete search history.

(56) References Cited

U.S. PATENT DOCUMENTS 5,576,117 A * 11/1996 Morita ................ H01M 50/109 429/162
5,725,967 A * 3/1998 Tuttle .................. H01M 50/154 429/173
(Continued)

FOREIGN PATENT DOCUMENTS

CN 1767227 A 5/2006
CN 1784797 A 6/2006
(Continued)

OTHER PUBLICATIONS

CN_211208486_U_ _Machine_Translation (Year: 2025).*
(Continued)

*Primary Examiner* — Nicole M. Buie-Hatcher
*Assistant Examiner* — Kenneth Max Otero
(74) *Attorney, Agent, or Firm* — Morgan, Lewis & Bockius LLP

(57) ABSTRACT

The present invention relates to a button-type secondary battery including: an electrode assembly; a lower can provided with an accommodation part having an accommodation groove for accommodating the electrode assembly in a top surface thereof, a connection part extending outward from an upper end of the accommodation part, and a bent part extending from a front end of the connection part to a lower side of the accommodation part; an upper can provided with a cover part disposed on a top surface of the accommodation part to finish the accommodation groove
(Continued)

and a bonding part formed along an edge surface of the cover part and bonded to the bent part; and a gasket provided between the lower can and the upper can, wherein a recessed lower insertion groove and a recessed upper insertion groove are formed in the bent part of the lower can and the bonding part of the upper can, which are in close contact with the gasket, respectively, and the lower insertion groove and the upper insertion groove are disposed to be spaced apart from each other so as not to face each other.

8 Claims, 10 Drawing Sheets

(51) Int. Cl.
*H01M 50/109* (2021.01)
*H01M 50/167* (2021.01)

(56) References Cited

U.S. PATENT DOCUMENTS

| | | | | |
|---|---|---|---|---|
| 2004/0197645 | A1* | 10/2004 | Buckle | H01M 4/364 429/174 |
| 2006/0093904 | A1 | 5/2006 | Cheon et al. | |
| 2006/0121344 | A1 | 6/2006 | Amagai et al. | |
| 2007/0224500 | A1* | 9/2007 | White | H01M 50/109 429/174 |
| 2009/0214948 | A1 | 8/2009 | Cheon et al. | |
| 2011/0067229 | A1 | 3/2011 | Amagai et al. | |
| 2011/0091753 | A1 | 4/2011 | Wang et al. | |
| 2011/0189535 | A1 | 8/2011 | Kim et al. | |
| 2012/0114986 | A1 | 5/2012 | Kim et al. | |
| 2013/0095374 | A1 | 4/2013 | Kim | |
| 2014/0315061 | A1 | 10/2014 | Wang | |
| 2018/0097215 | A1 | 4/2018 | Cho et al. | |
| 2019/0252648 | A1 | 8/2019 | Koyama et al. | |
| 2021/0111454 | A1 | 4/2021 | Zhu et al. | |
| 2023/0238624 | A1 | 7/2023 | Park et al. | |
| 2024/0194989 | A1 | 6/2024 | Cho et al. | |

FOREIGN PATENT DOCUMENTS

| | | | | |
|---|---|---|---|---|
| CN | 101728574 | A | | 6/2010 |
| CN | 102473863 | A | | 5/2012 |
| CN | 103392246 | A | | 11/2013 |
| CN | 107195807 | A | | 9/2017 |
| CN | 209709091 | U | | 11/2019 |
| CN | 211182396 | U | | 8/2020 |
| CN | 211208486 | U | * | 8/2020 |
| CN | 114846678 | A | | 8/2022 |
| CN | 115398723 | A | | 11/2022 |
| EP | 3503243 | A1 | | 6/2019 |
| EP | 4057430 | A1 | | 9/2022 |
| EP | 4120450 | A1 | | 1/2023 |
| JP | S52-103327 | U | | 8/1977 |
| JP | H1-81862 | U | | 5/1989 |
| JP | H6-48755 | U | | 7/1994 |
| JP | H09-045297 | A | | 2/1997 |
| JP | 2000-149884 | A | | 5/2000 |
| JP | 2002-124219 | A | | 4/2002 |
| JP | 2003-045480 | A | | 2/2003 |
| JP | 2006-522456 | A | | 9/2006 |
| JP | 2006-324059 | A | | 11/2006 |
| JP | 2009-530786 | A | | 8/2009 |
| JP | 2010-055961 | A | | 3/2010 |
| JP | 2013-134842 | A | | 7/2013 |
| JP | 2014-120449 | A | | 6/2014 |
| JP | 6697901 | B2 | | 5/2020 |
| JP | 2020-119628 | A | | 8/2020 |
| JP | 6734401 | B2 | | 8/2020 |
| KR | 10-2006-0037595 | A | | 5/2006 |
| KR | 10-2011-0089962 | A | | 8/2011 |
| KR | 10-2013-0040577 | A | | 4/2013 |
| KR | 10-2014-0078875 | A | | 6/2014 |
| KR | 10-2018-0036086 | A | | 4/2018 |

OTHER PUBLICATIONS

International Search Report (with partial translation) and Written Opinion dated Nov. 25, 2021, for corresponding International Patent Application No. PCT/KR2021/010666.
Office Action dated Nov. 7, 2024 issued in Chinese Patent Application No. 202180032336.4.
Extended European Search Report issued Apr. 18, 2024 for European Patent Application No. 21856232.0
Office Action issued on Oct. 3, 2023 for the corresponding Japanese patent application 2022-554345.
Notice of Allowance issued on Sep. 17, 2026 in Korean Patent Application No. 10-2021-0103498.

* cited by examiner

BUTTON-TYPE SECONDARY BATTERY AND METHOD FOR MANUFACTURING THE SAME

CROSS-REFERENCE TO RELATED APPLICATION

The present application claims the benefit of the priority of Korean Patent Application Nos. 10-2020-0100765, filed on Aug. 11, 2020, and 10-2021-0103498, filed on Aug. 5, 2021, which are hereby incorporated by reference in their entirety.

TECHNICAL FIELD

The present invention relates to a button-type secondary battery and a method for manufacturing the same, and more particularly, to a button-type secondary battery having improved bonding and adhesion by applying a crimping method, and a method for manufacturing the same.

BACKGROUND ART

In general, secondary batteries refer to chargeable and dischargeable, unlike primary batteries that are not chargeable. The secondary batteries are being widely used for mobile phones, notebook computers, and camcorders, electric vehicles, and the like.

The secondary battery comprises a button-type secondary battery having high energy density, high output, and long lifespan. The button-type secondary battery comprises an electrode assembly, a lower can accommodating the electrode assembly, an upper can coupled to the lower can, and a gasket sealing the lower can and the upper can. Also, the lower can and the upper can are bonded to each other through a welding method using a laser.

However, since the conventional button-type secondary battery uses a welding method using a laser when the lower can and the upper can are bonded to each other, there are problems in that a process for uniformly sealing is complex, and a lot of time is consumed. Also, a difference in binding force between the upper can and the lower can may occur. In addition, since an electrode terminal requires a rivet coated with an insulator, there is a problem that short circuit occurs when the insulator is damaged.

DISCLOSURE OF THE INVENTION

Technical Problem

The present invention has been invented to solve the above problems, and an object of the present invention is to provide a button-type secondary battery, in which a difference in bonding force between a lower can and an upper can is prevented from occurring by bonding the lower can to the upper can in a crimping method to significantly improve bonding force and sealing force between the lower can and the upper can, in particular, to simplify a process, reduce a working time, and prevent short circuit from occurring, and a method for manufacturing the same.

Technical Solution

A button-type secondary battery according to the present invention for achieving the above objects comprises: an electrode assembly; a lower can provided with an accommodation part having an accommodation groove for accommodating the electrode assembly in a top surface thereof, a connection part extending outward from an upper end of the accommodation part, and a bent part extending from a front end of the connection part to a lower side of the accommodation part; an upper can provided with a cover part disposed on a top surface of the accommodation part to finish the accommodation groove and a bonding part formed along an edge surface of the cover part and bonded to the bent part; and a gasket provided between the lower can and the upper can, wherein a recessed lower insertion groove and a recessed upper insertion groove are formed in the bent part of the lower can and the bonding part of the upper can, which are in close contact with the gasket, respectively, and the lower insertion groove and the upper insertion groove are disposed to be spaced apart from each other so as not to face each other.

Portions of the gasket may be introduced into the lower insertion groove and the upper insertion groove by crimping the bent part of the lower can and the bonding part of the upper can to form a lower insertion protrusion and an upper insertion protrusion on a surface of the gasket, a contact area between the lower can and the gasket may increase by the lower insertion protrusion, and a contact area between the upper can and the gasket may increase by the upper insertion protrusion.

The lower insertion groove or the upper insertion groove may have a triangular shape that gradually decreases in width toward the bottom.

The lower insertion groove or the upper insertion groove may be provided in two or more, and the two or more lower insertion grooves or the two or more upper insertion grooves may be provided to be connected to each other in a direction in which the lower can and the upper can are crimped.

The two or more lower insertion grooves or the two or more upper insertion grooves may be provided to increase in size in the direction in which the lower can and the upper can are crimped.

A recessed connection insertion groove and a recessed cover insertion groove may be formed in the connection part of the lower can and the cover part of the upper can, which are in close contact with the gasket, respectively, and the connection insertion groove and the cover insertion groove may be disposed to be spaced apart from each other so as not to face each other.

Portions of the gasket may be introduced into the connection insertion groove and the cover insertion groove by crimping the connection part of the lower can and the cover part of the upper can to form a connection insertion protrusion and a cover insertion protrusion on a surface of the gasket, respectively, a contact area between the lower can and the gasket may increase by the connection insertion protrusion, and a contact area between the upper can and the gasket may increase by the cover insertion protrusion.

Front ends of the bent part and the bonding part, which are bonded to each other with the gasket therebetween, may be swaged so that the bent part is in close contact with a surface of the accommodation part.

A method for manufacturing a button-type secondary battery according to the present invention comprises: a lower can preparation process of preparing a lower can comprising an accommodation part, in which an accommodation groove is formed in a top surface thereof, a connection part extending outward from an upper end of the accommodation part, and a bent part extending from a front end of the connection part to a lower side of the accommodation part, wherein a recessed lower insertion groove is formed in the bent part; an upper can preparation process of preparing an upper can comprising a cover part disposed on a top surface of the accommodation part and a bonding part formed along an edge surface of the cover part and bonded to the bent part, wherein a recessed upper insertion groove is formed in the bonding part; a placement process of disposing a gasket on an upper portion of the lower can after an electrode assembly is accommodated in the accommodation groove of the lower can; and a bonding process of bonding the bonding part of the upper can to the bent part to finish the accommodation groove of the lower can through the cover part of the upper can, wherein the lower insertion groove formed in the lower can and the upper insertion groove formed in the upper can are disposed to be spaced apart from each other so as not to face each other when the lower can and the upper can are bonded to each other.

The method may further comprise, after the bonding process, a crimping process of an inner circumferential surface of the bent part and an outer circumferential surface of the bonding part, which are disposed in a space between the accommodation part and the bent part, wherein, in the crimping process, when the bent part and the bonding part are crimped, portions of the gasket may be introduced into the lower insertion groove and the upper insertion groove form a lower insertion protrusion and an upper insertion protrusion on a surface of the gasket, respectively, a contact area between the lower can and the gasket may increase by the lower insertion protrusion, and a contact area between the upper can and the gasket may increase by the upper insertion protrusion.

In the lower can preparation process, a recessed connection insertion groove may be further formed in the connection part that is in close contact with the gasket, in the upper can preparation process, a recessed cover insertion groove may be further formed in the cover part that is in close contact with the gasket, and the connection insertion groove and the cover insertion groove may be disposed to be spaced apart from each other so as not to face each other when the lower can and the upper can are bonded to each other.

The crimping process may further comprise a secondary crimping process of crimping a bottom surface of the connection part and a top surface of the cover part, wherein, in the secondary crimping process, when the bottom surface of the connection part and the top surface of the cover part are crimed, portions of the gasket may be introduced into the connection insertion groove and the cover insertion groove to form a connection insertion protrusion and a cover insertion protrusion on the surface of the gasket, respectively.

The method may further comprise, after the crimping process, a swaging process of swaging front ends of the bent part and the bonding part, which are bonded to each other with the gasket therebetween, so that the bent part is in close contact with a surface of the accommodation part, wherein, in the swaging process, as the bonding part may be bent to be inclined with respect to an edge surface of the cover part, the front end of the bent part of the lower can is in close contact with the surface of the accommodation part.

Advantageous Effects

The button-type secondary battery according to the present invention may comprise the lower can, the upper can, and the gasket, the lower can may be provided with the accommodation part, the connection part, and the bent part, and the upper can may be provided with the cover part and the bonding part. Due to this feature, the surface of the lower can and the surface of the upper can, which correspond to each other, may be directly pressed to be crimped, thereby minimizing the difference in bonding force between the lower can and the upper can, resulting in improving the bonding force and the sealing force between the lower can and the upper can. In particular, the button-type secondary battery, which has the above-described structure, according to the present invention may significantly simplify the process and significantly reduce the working time and significantly prevent the short circuit from occurring.

In addition, in the button-type secondary battery according to the present invention, the recessed lower insertion groove and the recessed upper insertion groove may be formed in the bent part of the lower can and the bonding part of the upper can, respectively, and the lower insertion groove and the upper insertion groove may be disposed to be spaced apart from each other so as not to face each other. Therefore, when the lower can and the upper can are crimped, the portions of the gasket may be introduced into the lower insertion groove and the upper insertion groove to form the lower insertion protrusion and the upper insertion protrusion on the surface of the gasket, thereby improving the bonding force and the sealing force between the lower can and the upper can by the insertion protrusions.

That is, the button-type secondary battery according to the present invention may crimp the inner circumferential surface of the bent part and the outer circumferential surface of the bonding part, which are disposed in the space between the accommodation part and the bent part, and thus, portions of the gasket may be introduced into the lower insertion groove and the upper insertion groove to stably form the lower insertion protrusion and the upper insertion protrusion on the surface of the gasket. In particular, the amount of insertion of the gasket may be sufficiently ensured.

In addition, in the button-type secondary battery of the present invention, the lower insertion groove or the upper insertion groove may have the triangular shape that gradually decreases in width toward the bottom. Due to this feature, the gasket may be stably introduced into the entire lower and upper insertion grooves, and thus, the lower insertion protrusion having the same shape as the lower insertion groove and the upper insertion groove may be formed. In particular, the amount of insertion of the gasket may be sufficiently ensured.

In addition, in the button-type secondary battery according to the present invention, the recessed connection insertion groove and the recessed cover insertion groove may be formed in the connection part of the lower can and the cover part of the upper can, which are in close contact with the gasket, and the connection insertion groove and the cover insertion groove may be disposed to be spaced apart from each other so as not to face each other. Due to this feature, the bottom surface of the connection part and the top surface of the cover part may be crimped, and thus, the portions of the gasket may be introduced into the connection insertion groove and the cover insertion groove to form the connection insertion protrusion and the cover insertion protrusion on the surface of the gasket, thereby improving the bonding force and the sealing force between the upper can and the lower can.

MODE FOR CARRYING OUT THE INVENTION

Figure 1:
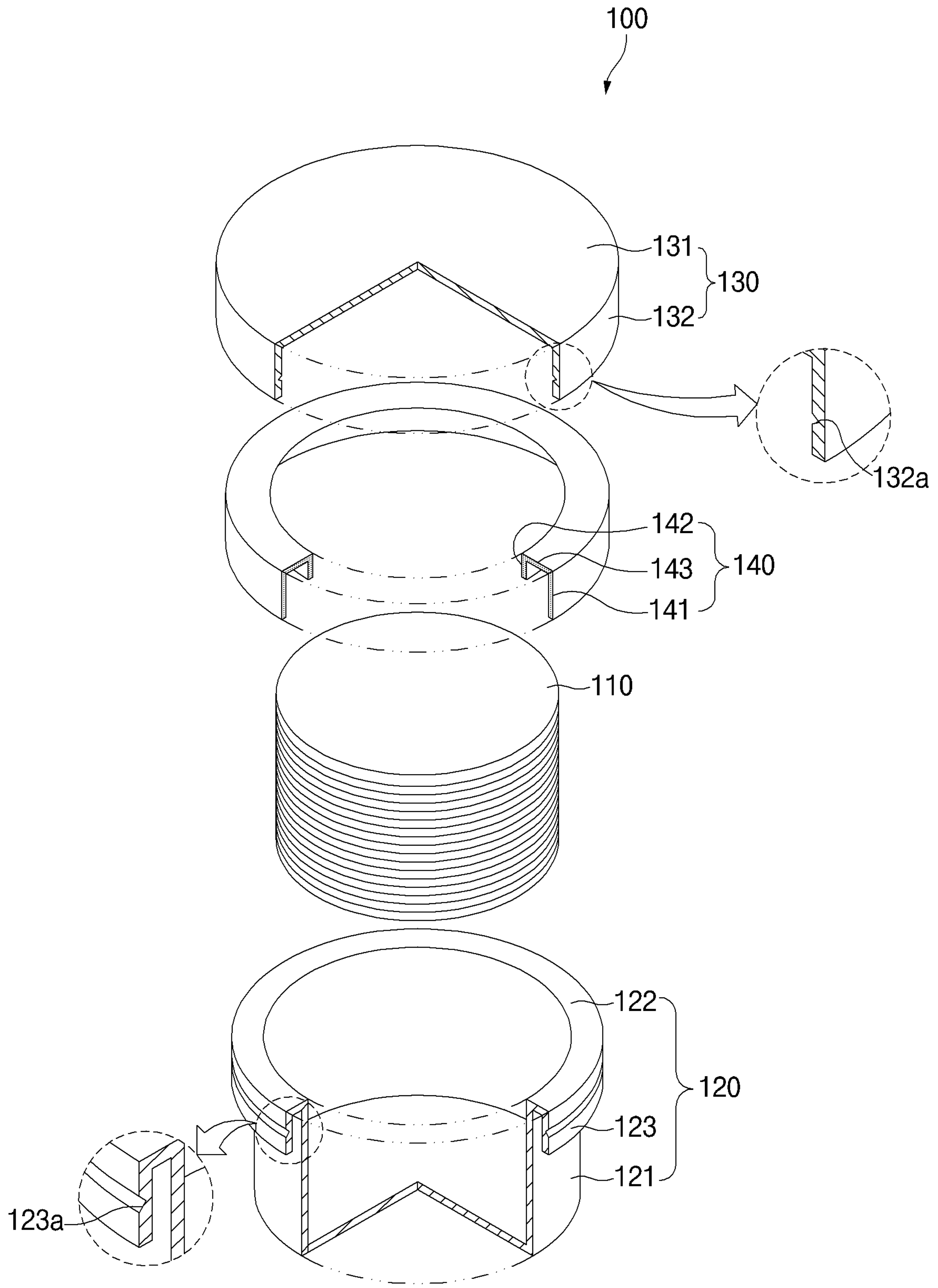
FIG. 1 is an exploded perspective view of a button-type secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Button-Type Secondary Battery According to First Embodiment of the Present Invention]

As illustrated in FIGS. 1 to 4, a button-type secondary battery 100 according to a first embodiment of the present invention is a secondary battery, of which a length of a diameter is greater than a height, and comprises an electrode assembly 110 and a can assembly accommodating the electrode assembly 110.

The button-type secondary battery 100 is referred as a coin cell, also referred to as a Ruben battery, an RM battery, and a mercury battery. Such a button-type secondary battery 100 may be made small and thus be widely used in hearing aids, portable lighters, wireless microphones, cameras, watches, and the like. Also, zinc is used for a negative electrode, mercury oxide is used for a positive electrode, and zinc oxide and potassium hydroxide are used for an electrolyte.

Electrode Assembly

The electrode assembly 110 has a three-layered structure in which a first electrode, a separator, and a second electrode are sequentially stacked. The electrode assembly is not limited to the three-layered structure and may have a three or more-layered structure in which a first electrode and a second electrode are alternately stacked with a separator interposed therebetween.

Here, the separator is formed to be larger than each of the first electrode and the second electrode, and thus, the separator prevents the first electrode and the second electrode from being grounded, and as a result, an accident due to short circuit is prevented. The first electrode is a negative electrode, and the second electrode is a positive electrode.

The can assembly comprises a lower can 120 connected to a first electrode of the electrode assembly 110 and serving as a first electrode terminal, an upper can 130 connected to a second electrode of the electrode assembly 110, bonded to surround the lower can 120, and serving as a second electrode terminal, and a gasket 140 provided between the lower can 120 and the upper can 130 to seal and insulate the lower can 120 from the upper can 130 and seal a gap between the lower can 120 and the upper can 130.

The button-type secondary battery 100 according to the first embodiment of the present invention has a structure, in which surfaces of the lower can 120 and the upper can 130 are directly crimped. Thus, a difference in bonding force between the lower can 120 and the upper can 130 may be minimized, and bonding force and sealing force between the lower can 120 and the upper can 130 may increase.

Lower Can

Figure 2:
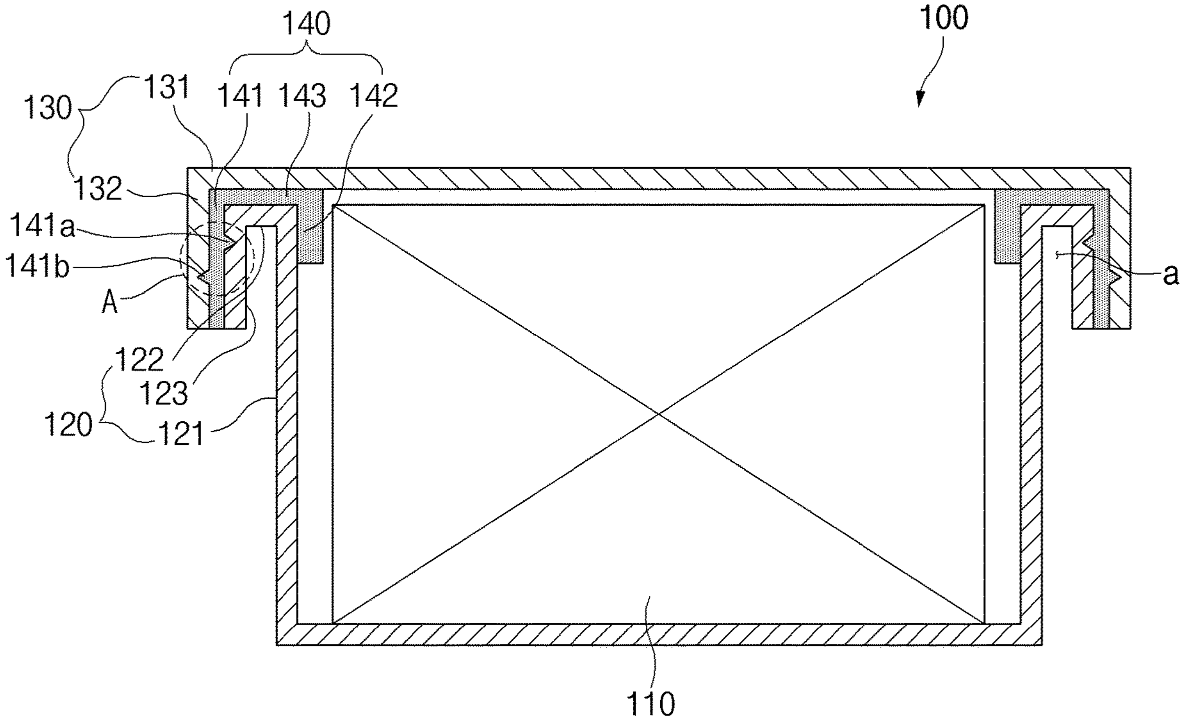
FIG. 2 is a cross-sectional view of a button-type secondary battery according to the first embodiment of the present invention.
Figure 3:
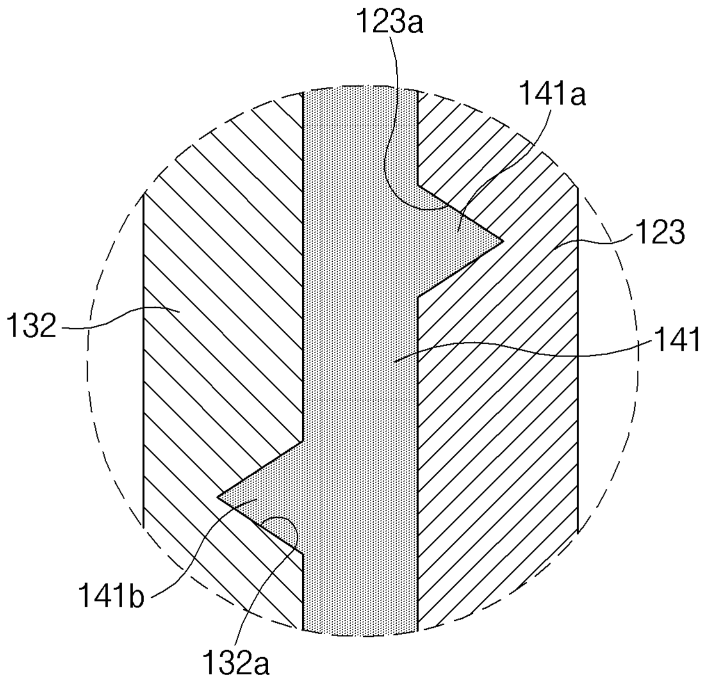
FIG. 3 is an enlarged view of a portion A of FIG. 2.

Referring to FIG. 2, the lower can 120 comprises a cylindrical accommodation part 121 having an accommodation groove for accommodating the electrode assembly 110 in a top surface thereof, a connection part 122 extending horizontally outward from an upper end of the accommodation part, and a bent part 123 extending vertically from a front end of the connection part 122 to a lower side of the accommodation part 121.

The lower can 120 having the above-described structure may comprise the accommodation part 121, the connection part 122, and the bent part 123, and thus, a space between the accommodation part 121 and the bent part 123, that is, an insertion space a may be secured, and the insertion space a may expose an inner surface (an inner surface of the bent part facing the accommodation part of the lower can when viewed in FIG. 2) of the bent part 123 facing the accommodation part or a bottom surface (a bottom surface of the connection part when viewed in FIG. 2) of the connection part 122 to the outside. Thus, the inner surface of the bent part 123 and the bottom surface of the connection part 122 may be directly pressed to be crimped, and as a result, the difference in bonding force between the lower can 120 and the upper can 130 may be minimized.

The accommodation part 121, the connection part 122, and the bent part 123 may be integrally formed to simplify the structure and improve manufacturing efficiency.

Each of the connection part 122 and the bent part 123 may have a thickness less than that of the accommodation part 121. That is, the accommodation part has strength greater than that of each of the connection part and the bent part. Thus, the bent part 123 may be effectively swaged to be bent, and as a result, the front end of the bent part 123 may be in surface contact with the accommodation part 121. In particular, since the accommodation part has strength greater than that of the bent part, even though the bent part is bent, the bent part may not be deformed to stably protect the electrode assembly accommodated in the accommodation part.

Upper Can

The upper can 130 comprises a cover part 131 disposed on a top surface of the accommodation part 121 to finish the accommodation groove and a bonding part 132 formed along an edge surface of the cover part 131 and bonded to the bent part 123.

Here, an end of the bonding part 132 may further protrude from an end of the bent part 123 when viewed from a bottom surface of the accommodation part. Thus, when the ends of the bent part and the bonding part 132 are bent in a direction toward an outer circumferential surface of the accommodation part through the swaging, the end of the bonding part 132 may be disposed to be in close contact with the accommodation part with the gasket 140 therebetween.

Figure 4:
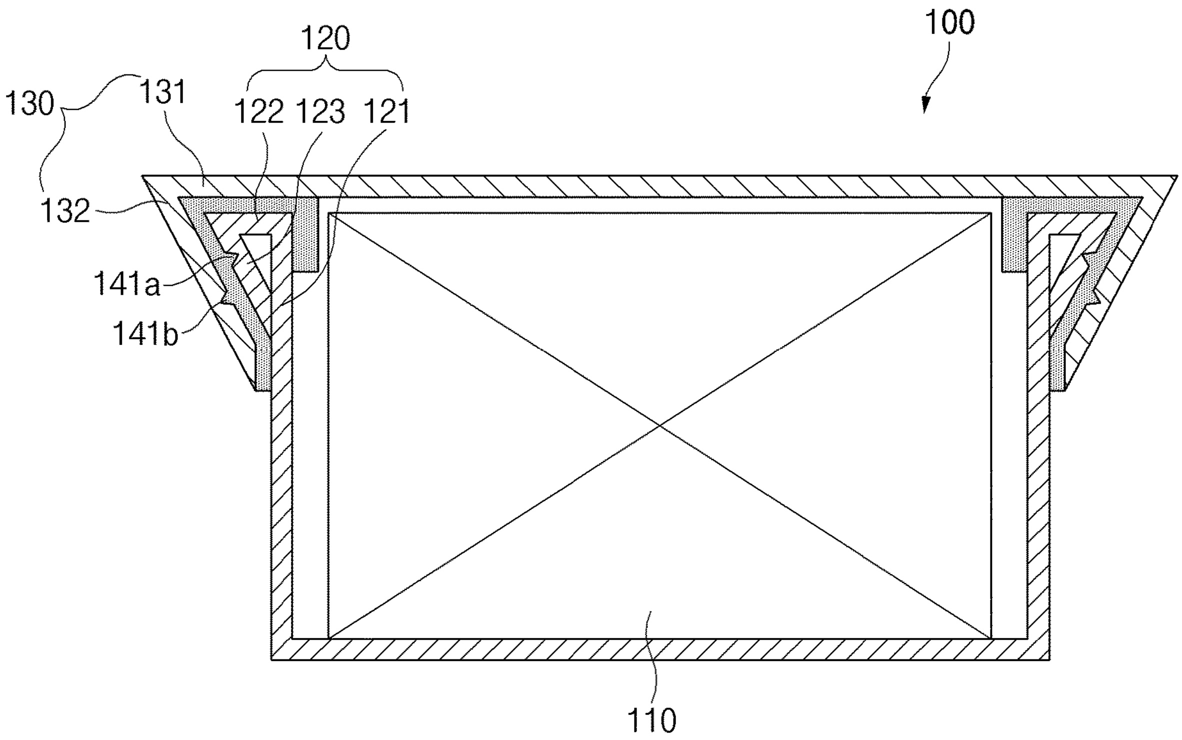
FIG. 4 is a cross-sectional view illustrating a state in which swaging is applied to the button-type secondary battery according to the first embodiment of the present invention.
Figure 5:
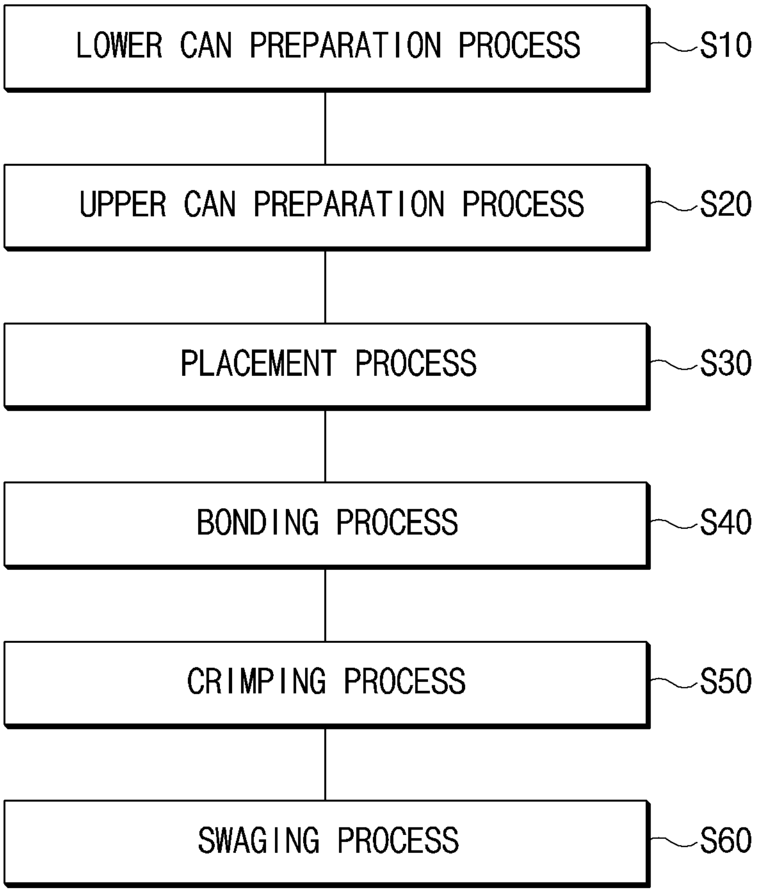
FIG. 5 is a flowchart illustrating a method for manufacturing a button-type secondary battery according to the first embodiment of the present invention.

Here, an outer gasket 141 between the bent part 123 and the bonding part 132 may extend to be disposed between the accommodation part 121 and the bonding part 132, and thus, the contact between the end of the bonding part 132 and the outer circumferential surface of the accommodation part 121 may be prevented to prevent short circuit from occurring (see FIG. 4).

Gasket

The gasket 140 is configured to seal the gap between the lower can and the upper can and insulate the lower can from the upper can and comprises an outer gasket 141 provided between the bent part 123 and the bonding part 132, an inner gasket 142 that is in close contact with the inner circumferential surface of the accommodation part 121, and a connection gasket 143 provided between the connection part 122 and the cover part 131 to connect the outer gasket 141 to the inner gasket 142.

The button-type secondary battery 100, which has the above-described structure, according to the first embodiment of the present invention may comprise the lower can provided with the accommodation part, the connection part, and the bent part to form the insertion space a between the accommodation part 121 and the bent part 123, and the inner surface of the bent part 123 of the lower can and the outer surface of the bonding part 132 of the upper can may be crimped, i.e., be directly pressed through the insertion space a. Thus, the bent part 123 and the bonding part 132 may be effectively crimped, and as a result, the difference in bonding force between the lower can 120 and the upper can 130 may be minimized. In addition, the bonding force and sealing force between the lower can 120 and the upper can 130 may increase.

That is, the technical feature of the button-type secondary battery 100 according to the first embodiment of the present invention is to directly press the bent part 123 and the bonding part 132, which correspond to each other, at the same time to crimp the bent part 123 and the bonding part 132.

In the button-type secondary battery 100 according to the first embodiment of the present invention, a recessed lower insertion groove 123*a* and a recessed upper insertion groove 132*a* are formed in the bent part 123 of the lower can 120 and the bonding part 132 of the upper can 130, which are in close contact with the gasket 140, respectively.

That is, the recessed lower insertion groove 123*a* having a closed curve shape is formed in the outer circumferential surface of the bent part 123 that is in close contact with the gasket 140, and the recessed upper insertion groove 132*a* having a closed curve shape is formed in the inner circumferential surface of the bonding part 132 that is in close contact with the gasket 140.

Here, the lower insertion groove 123*a* and the upper insertion groove 132*a* are disposed to be spaced apart from each other so as not to face each other when viewed in a state in which the lower can 120 and the upper can 130 are bonded to each other.

Thus, when the bent part 123 of the lower can 120 and the bonding part 132 of the upper can 130 are crimped, portions of the gasket 140 are introduced (i.e., inserted) into the lower insertion groove 123*a* and the upper insertion groove 132*a* to form a lower insertion protrusion 141*a* and an upper insertion protrusion 141*b* on a surface of the gasket 140, respectively. As a result, a contact area between the lower can 120 and the gasket 140 may increase by the lower insertion protrusion 141*a* to increase in adhesion and bonding force. In addition, a contact area between the upper can 130 and the gasket 140 may increase by the upper insertion protrusion 141*b* to increase in adhesion and bonding force.

The crimping refers to a process of press-fitting or clamping two objects.

In more detail, the bent part 123 of the lower can 120 and the bonding part 132 of the upper can 130 are crimped to be pressed. Here, the bent part 123 may be directly pressed through the insertion space a. Then, the same force is applied to the bonding part 132 of the upper can 130 and the bent part 123 of the lower can 120, and thus, the outer gasket 141 of the gasket disposed between the upper can 130 and the lower can 120 is pressed. Here, a portion of the outer gasket 141 is inserted into the lower insertion groove 123*a* to form the lower insertion protrusion 141*a* and also is inserted into the upper insertion groove 132*a* to form the upper insertion protrusion 141*b*.

That is, the lower insertion protrusion 141*a* inserted into the lower insertion groove 123*a* and the upper insertion protrusion 141*b* inserted into the upper insertion groove 132*a* are formed at both sides of the gasket 140.

Particularly, the lower insertion groove 123*a* and the upper insertion groove 132*a* are disposed in the lower can 120 and the upper can 130 to be spaced apart from each other so as not to face each other. Thus, the lower insertion protrusion 141*a* and the upper insertion protrusion 141*b* formed on the surface of the gasket 140 are spaced apart from each other so as not to face each other. As a result, an amount of insertion of the gasket 140, which is inserted into each of the lower insertion groove 123*a* and the upper insertion groove 132*a*, may be sufficiently secured. Thus, since the amount of insertion of the gasket, which is inserted into the lower insertion groove 123*a* and the upper insertion groove 132*a*, is sufficiently secured, the lower insertion protrusion 141*a* and the upper insertion protrusion 141*b* may be stably formed, and as a result, the adhesion force and the bonding force between the lower can 120 and the upper can 130 may increase.

Here, the lower insertion protrusion 141*a* may be provided to adhere to the lower insertion groove 123*a*, and the upper insertion protrusion 141*b* may be provided to adhere to the upper insertion groove 132*a*. For example, the lower insertion protrusion 141*a* may adhere to the lower insertion groove 123*a* through an adhesive, and the upper insertion protrusion 141*b* may adhere to the upper insertion groove 132*a* through an adhesive.

In the button-type secondary battery 100 according to the first embodiment of the present invention, the upper insertion groove 132*a* is formed to be larger than the lower insertion groove 123*a*. That is, referring to FIG. 2, the contact area between the upper can 130 and the gasket 140 is less than that between the lower can 120 and the gasket 140. Thus, the upper insertion groove 132*a* is formed to be larger than the lower insertion groove 123*a* to increase in contact area between the upper can 130 and the gasket 140, thereby preventing the electrolyte from leaking.

In the button-type secondary battery 100 according to the first embodiment of the present invention, the lower insertion groove 123*a* or the upper insertion groove 132*a* may have a triangular shape of which a width gradually decreases toward the bottom. That is, the amount of insertion of the gasket 140 gradually decreases toward the bottom of the lower insertion groove 123*a* or the upper insertion groove 132*a*. Thus, the lower insertion groove 123*a* or the upper insertion groove 132*a* may be formed in the triangular shape, and thus, the amount of insertion of the gasket 140 may be stably secured up to the bottom of the lower insertion groove 123*a* or the upper insertion groove 132*a*. As a result, the insertion protrusions may be stably formed on the surface of the gasket 140.

Each of the lower insertion groove or the upper insertion groove may be formed in a semicircular shape that gradually decreases in width toward the bottom.

Here, the lower insertion groove 123*a* or the upper insertion groove 132*a* may be formed in the form of a right-angled triangle in which an inner wall facing the lower can 120 is horizontal. Thus, each of the insertion protrusions 141*a* and 141*b* formed on the gasket 140 may also be formed in the form of a right-angled triangle. That is, when crimping the lower can 120 and the upper can 130, a portion of the gasket may be hooked in the lower insertion groove 123*a* or the horizontal inner wall of the upper insertion groove 132*a*, and thus, the amount of insertion of the gasket, which is inserted into the lower insertion groove 123*a* or the upper insertion groove 132*a*, may be sufficiently secured, and as a result, the lower insertion protrusion may be smoothly formed.

In the button-type secondary battery 100 according to the first embodiment of the present invention, the ends of the bent part and the bonding part, which are bonded to each other with the gasket 140 therebetween, are swaged, so that the bent part 123 is in surface contact with the surface of the accommodation part 121.

Here, the outer gasket 141 between the bent part 123 and the bonding part 132 may extend to be disposed between the accommodation part 121 and the bonding part 132, and thus, the contact between the end of the bonding part 132 and the outer circumferential surface of the accommodation part 121 may be prevented to prevent the short circuit from occurring. In addition, the insertion space a formed between the accommodation part 121 and the bent part 123 may be finished to prevent foreign substances from being introduced into the insertion space a.

Therefore, the button-type secondary battery 100 according to the first embodiment of the present invention can minimize the difference in bonding force between the lower can and the upper can by directly pressing the lower can and the upper can, and as a result, the bonding force and the sealing force between the lower can and the upper can may increase.

Hereinafter, a method for manufacturing a button-type secondary battery according to a first embodiment of the present invention will be described.

[Method for Manufacturing Button-Type Secondary Battery According to First Embodiment of the Present Invention]

As illustrated in FIGS. 5 to 8, a method for manufacturing a button-type secondary battery according to the first embodiment of the present invention comprises a lower can preparation process (S10), an upper can preparation process (S20), a placement process (S30), a bonding process (S40), a crimping process (S50), and a swaging process (S60).

Lower can Preparation Process

Figure 6:
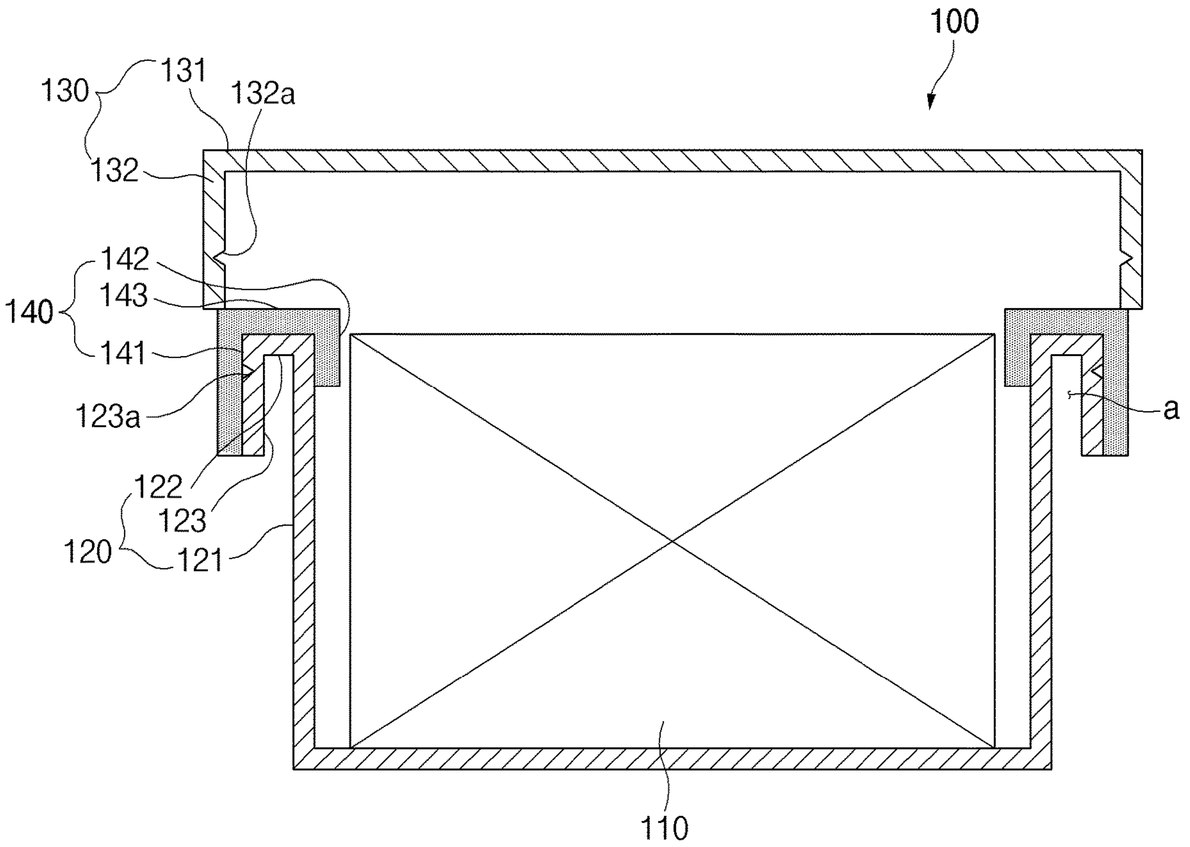
FIG. 6 is a cross-sectional view illustrating a lower can preparation process, an upper can preparation process, and a placement process in a method for manufacturing the button-type secondary battery according to the first embodiment of the present invention.

Referring to FIG. 6, in the lower can preparation process (S10), a lower can 120 provided with an accommodation part 121, a connection part 122, and a bent part 123 is prepared.

That is, the lower can 120 comprises a cylindrical accommodation part 121 having an accommodation groove for accommodating an electrode assembly 110, a connection part 122 extending horizontally outward from an upper end of the accommodation part, and a bending part 123 extending vertically from a front end of the connection part 122 to a lower side of the accommodation part 121. In addition, a recessed lower insertion groove 123*a* is formed in an outer circumferential surface of the bent part 123.

Here, an insertion space a is formed between the accommodation part 121 and the bent part 123, and the insertion space a exposes the inner circumferential surface of the bent part 123 and a bottom surface of the connection part 122 to the outside.

Upper can Preparation Process

Referring to FIG. 6, in the upper can preparation process (S20), an upper can 130 provided with a cover part 131 and a bonding part 132 is prepared.

That is, the upper can 130 comprises a cover part 131 disposed on a top surface of the accommodation part 121 to finish the accommodation groove and a bonding part 132 formed along an edge surface of the cover part 131 and bonded to the bent part 123. In addition, a recessed upper insertion groove 132*a* is formed in an inner circumferential surface of the bonding part 132.

Here, the lower insertion groove 123*a* and the upper insertion groove 132*a* are disposed to be spaced apart from each other so as not to be disposed on the same horizontal line when the bonding of the lower can and the upper can is completed.

Particularly, each of the lower insertion groove 123*a* and the upper insertion groove 132*a* is formed in a triangular shape. Thus, when the lower can 120 and the upper can 130 are crimped, a portion of the gasket 140 disposed between the lower can 120 and the upper can 130 may be induced to be smoothly introduced up to the bottom of each of the lower insertion groove 123*a* and the upper insertion groove 132*a*.

Placement Process

Referring to FIG. 6, in the placement process (S30), an electrode assembly 110 is accommodated in the accommodation part 121 of the lower can 120, and then, the gasket 140 is disposed on an upper portion of the lower can 120.

Here, the gasket 140 comprises an outer gasket 141 disposed between the bent part 123 and the bonding part 132, an inner gasket 142 that is disposed to be in close contact with the inner circumferential surface of the accommodation part 121, and a connection gasket 143 disposed between the connection part 122 and the cover part 131 to connect the outer gasket 141 to the inner gasket 142.

That is, in the gasket 140, the outer gasket 141 is supported on the outer circumferential surface of the lower can 120, the inner gasket 142 is supported on the inner circumferential surface of the lower can 120, and the connection gasket 143 is supported on an upper end surface of the lower can 120.

Bonding Process

Figure 7:
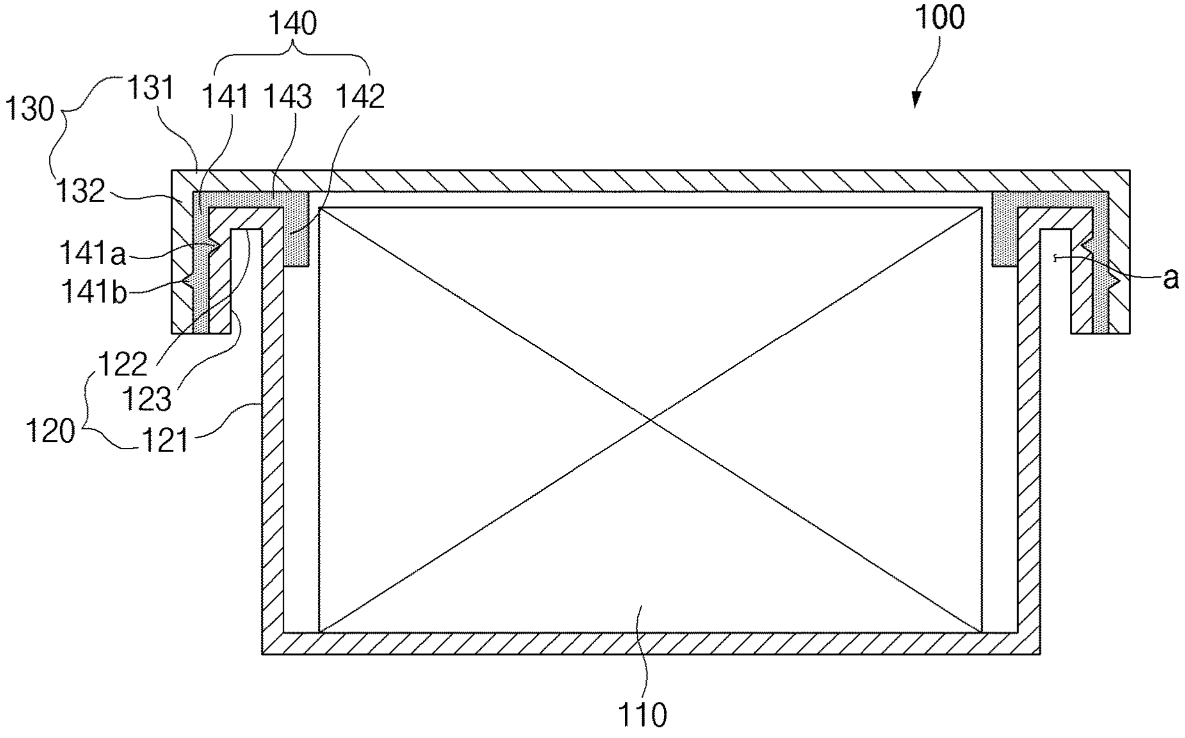
FIG. 7 is a cross-sectional view illustrating a bonding process and a crimping process in the method for manufacturing the button-type secondary battery according to the first embodiment of the present invention.

Referring to FIG. 7, in the bonding process (S40), the upper can 130 is disposed on an upper portion of the lower can 120 on which the gasket 140 is disposed, and then, the bonding part 132 of the upper can 130 is bonded to the bent part 123 of the lower can 120. Then, the accommodation groove of the lower can 120 may be finished through the cover part 131 of the upper can 130.

That is, the lower can 120 and the upper can 130 are pressed in a mutually bonded direction. Then, the bonding part 132 of the upper can 130 may be bonded to the bent part 123 of the lower can 120 to increase in bonding force. In addition, the gasket 140 may be disposed between the bent part 123 and the bonding part 132 to increase in adhesion and sealing force.

Crimping Process

Referring to FIG. 7, in the crimping process (S50), after the bonding process (S40), a space between the accommodation part 121 and the bent part 123, i.e., an inner surface of the bent part 123 and an outer surface of the bonding part 132, which are disposed in the insertion space a, are simultaneously pressed to be crimped.

That is, the lower can 120 and the upper can 130 may be pressed with the same force. Thus, a difference in bonding force between the lower can 120 and the upper can 130 may be minimized, and the bonding force and sealing force between the lower can 120 and the upper can 130 may increase.

In particular, since the accommodation part 121 is not pressed, it is possible to prevent the accommodation part from being deformed, and as a result, safety of the electrode assembly 110 accommodated in the accommodation part may be improved.

In addition, in the crimping process (S50), when the bent part 123 and the bonding part 132 are pressed, portions of the gasket 140 may be introduced into the lower insertion groove 123*a* and the upper insertion groove 132*a*, and thus, a lower insertion protrusion 141*a* and an upper insertion protrusion 141*b* may be formed on a surface of the gasket 140, and as a result, the bonding force and sealing force between the lower can 120 and the upper can 130 may increase.

That is, a contact area between the lower can 120 and the gasket 140 may increase by the lower insertion protrusion 141*a* to increase in adhesion and bonding force. In addition, a contact area between the upper can 130 and the gasket 140 may increase by the upper insertion protrusion 141*b* to increase in adhesion and bonding force.

Swaging Process

Figure 8:
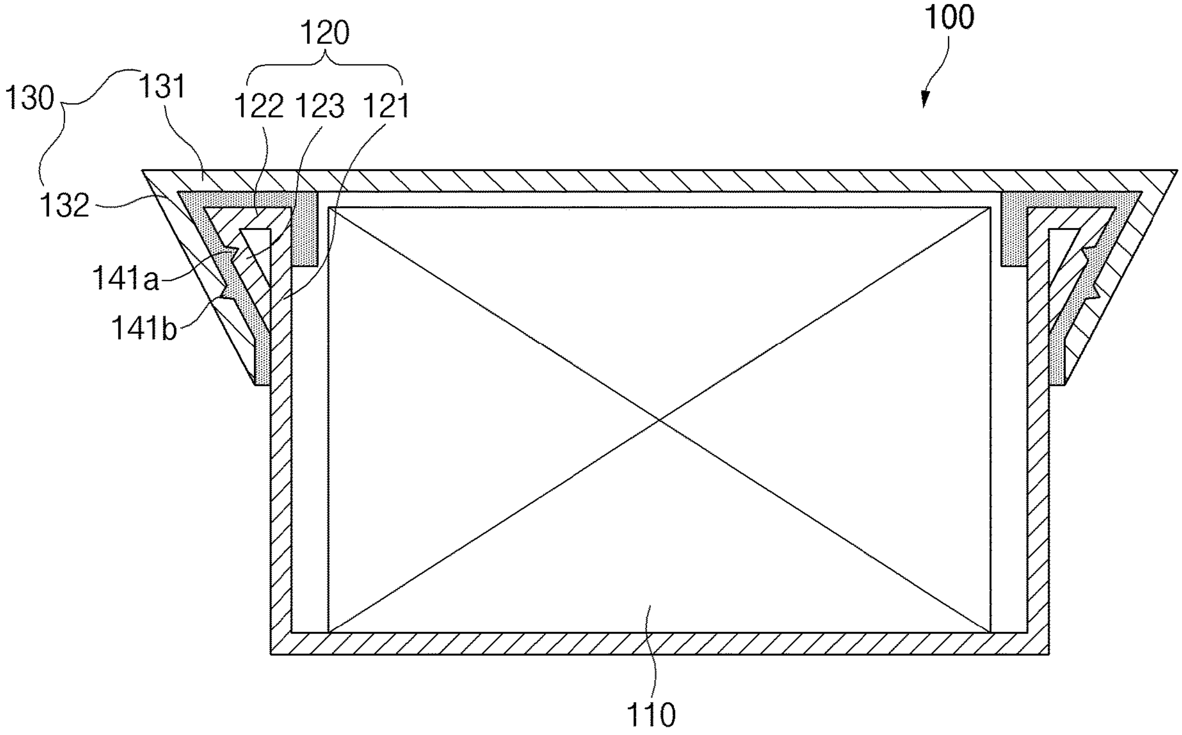
FIG. 8 is a cross-sectional view illustrating a swaging process in the method for manufacturing the button-type secondary battery according to the first embodiment of the present invention.

Referring to FIG. 8, in the swaging process (S60), after the crimping process (S50), the bonding part 132 of the upper can 130 is swaged in a direction of the accommodation part 121 of the lower can 120. That is, the front ends of the bent part and the bonding part, which are bonded to each other with the gasket therebetween, are swaged so that the bent part is in close contact with the surface of the accommodation part.

Then, as the bonding part is bent to be inclined with respect to an edge surface of the cover part, the front end of the bent part of the lower can is in close contact with the surface of the accommodation part.

Therefore, when the above processes are completed, the finished button-type secondary battery 100 may be manufactured.

Hereinafter, in descriptions of another embodiment of the present invention, constituents having the same function as the above-mentioned embodiment have been given the same reference numeral in the drawings, and thus duplicated description will be omitted.

[Button-Type Secondary Battery According to Second Embodiment of the Present Invention]

Figure 9:
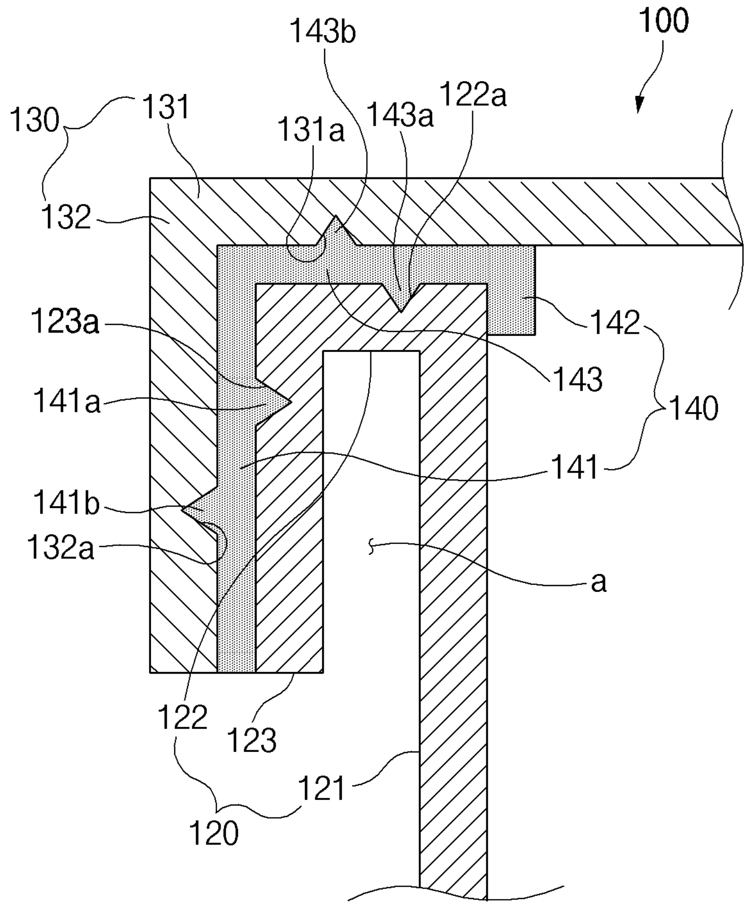
FIG. 9 is a cross-sectional view of a button-type secondary battery according to a second embodiment of the present invention.

As illustrated in FIG. 9, a secondary battery 100 according to a second embodiment of the present invention comprises an electrode assembly 110, a lower can 120, an upper can 130, and a gasket 140.

Here, a recessed connection insertion groove 122*a* and a recessed cover insertion groove 131*a* are formed in a connection part 122 of the lower can 120 and a cover part 131 of the upper can 130, which are in close contact with the gasket 140, respectively.

That is, the connection insertion groove 122*a* is formed in a top surface (i.e., a top surface of the connection part when viewed in FIG. 8) of the connection part 122 that is in close contact with the gasket 140, and the cover insertion groove 131*a* is formed in a bottom surface (i.e., a bottom surface of the connection part when viewed in FIG. 8) of the cover part 131 that is in close contact with the gasket 140.

In particular, the connection insertion groove 122*a* and the cover insertion groove 131*a* are disposed to be spaced apart from each other so as not to face each other when the lower can and the upper can are bonded to each other.

In the button-type secondary battery 100, which has the above-described configuration, according to the second embodiment of the present invention, the bottom surface of the connection part 122 and the top surface of the cover part 131, which are disposed in the space between the accommodation part 121 and the bent part 123 of the lower can 120, i.e., the insertion space a may be directly pressed, i.e., crimped to minimize a difference in bonding force between the lower can and the upper can.

In particular, in the button-type secondary battery 100 according to the second embodiment of the present invention, portions of the gasket 140 may be introduced into the connection insertion groove 122*a* and the cover insertion groove 131*a* to form a connection insertion protrusion 143*a* and a cover insertion protrusion 143*b* on a surface of the gasket 140, thereby significantly improving bonding force and sealing force between the lower can and the upper can.

The bonding force and sealing force of the lower can and the gasket may increase while the contact area therebetween increases due to the connection insertion protrusion, and the bonding force and sealing force of the upper can and the gasket may increase while the contact area therebetween increases due to the cover insertion protrusion.

A method for manufacturing a button-type secondary battery according to the second embodiment of the present invention comprises a lower can preparation process (S10), an upper can preparation process (S20), a placement process (S30), a bonding process (S40), a crimping process (S50), and a swaging process (S60).

The lower can preparation process (S10), the upper can preparation process (S20), the placement process (S30), the bonding process (S40), the crimping process (S50), and the swaging process (S60) are the same as those in the method for manufacturing the button-type secondary battery according to the foregoing first embodiment, and thus, detailed descriptions thereof will be omitted.

Here, in the method for manufacturing the button-type secondary battery according to the second embodiment of the present invention, in the lower can preparation process, a recessed connection insertion groove 122*a* is further formed in the connection part 122 that is in close contact with the gasket, and in the upper can preparation process, a recessed cover insertion groove 131*a* is further formed in the cover portion 131 that is in close contact with the gasket 140.

Here, the connection insertion groove 122*a* and the cover insertion groove 131*a* are formed to be spaced apart from each other so as not to face each other when the lower can and the upper can are bonded to each other.

In addition, the method for manufacturing the button-type secondary battery according to the second embodiment of the present invention further comprises a secondary crimping process of crimping a bottom surface of the connection part 122 and a top surface of the cover part 131 in the crimping process. In the secondary crimping process, when the bottom surface of the connection part 122 and the top surface of the cover part 131 are crimped, portions of the gasket 140 are introduced into the connection insertion groove 122*a* and the cover insertion groove 131*a* to form a connection insertion protrusion 143*a* and a cover insertion protrusion 143*b* on a surface of the gasket, respectively. Therefore, bonding force and sealing force between the lower can and the upper can may increase.

[Button-Type Secondary Battery According to Third Embodiment of the Present Invention]

Figure 10:
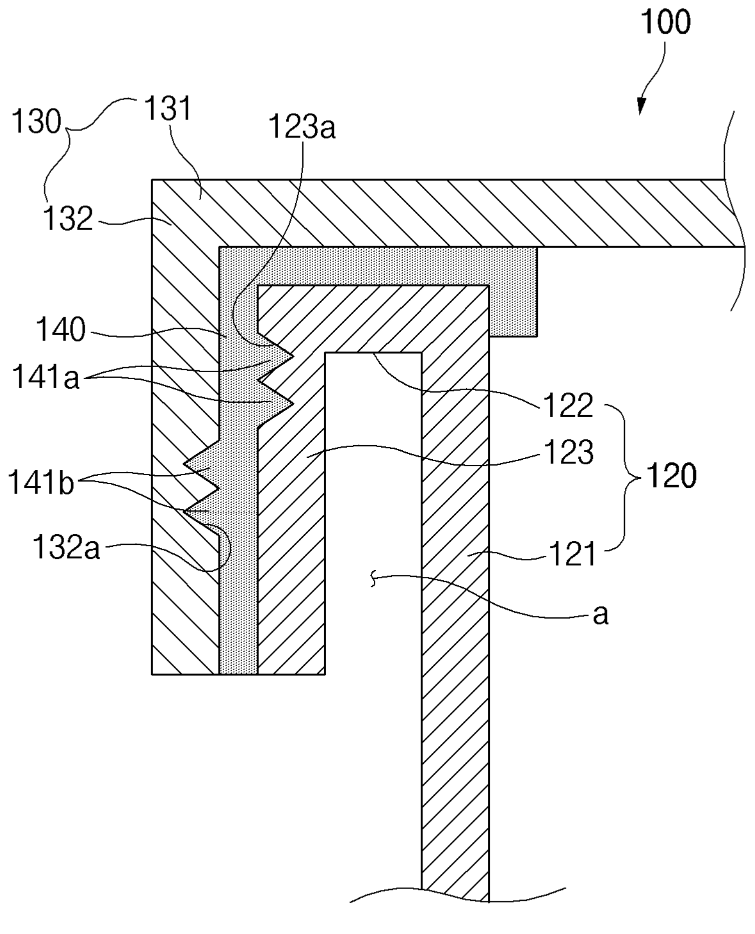
FIG. 10 is a cross-sectional view of a button-type secondary battery according to a third embodiment of the present invention.

As illustrated in FIG. 10, a button-type secondary battery 100 according to a third embodiment of the present invention has a lower can 120 having a lower insertion groove 123*a* formed in an outer circumferential surface thereof, and an upper can 130 having an upper insertion groove 132*a* in an inner circumferential surface thereof.

Here, the lower insertion groove 123*a* or the upper insertion groove 132*a* is provided in two or more, and the two or more lower insertion grooves 123*a* or the two or more upper insertion grooves 132*a* has a structure in which the lower can 120 and the upper can 130 are connected to each other in a direction (a vertical direction when viewed in FIG. 10) in which the lower can 121 and the upper can 122 are crimped.

Thus, in the button-type secondary battery 100 according to the second embodiment of the present invention, when the lower can 120 and the upper can 130 are crimped, portions of the gasket 140 may be introduced into two or more lower insertion grooves 123*a* or upper insertion grooves 132*a* to form two or more lower insertion protrusions 141*a* and two or more upper insertion protrusions 141*b*. Therefore, coupling force and sealing force between the lower can 120 and the upper can 130 may significantly increase.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Button-type secondary battery
110: Electrode assembly
120: Lower can
121: Accommodation part
122: Connection part
122*a*: Connection insertion groove
123: Bent part
123*a*: Lower insertion groove
130: Upper can
131: Cover part
131*a*: Cover insertion groove
132: Bonding part
132*a*: Upper insertion groove
140: Gasket
141: Outer gasket
141*a*: Lower insertion protrusion
141*b*: Upper insertion protrusion
142: Inner gasket
143: Connection gasket
143*a*: Connection insertion protrusion
143*b*: Cover insertion protrusion

The invention claimed is:

1. A button-type secondary battery comprising:
an electrode assembly;
a lower can including an accommodation part having a downward recess for accommodating the electrode assembly in the downward recess, a connection part extending horizontally outward from an upper end of the accommodation part, and a bent part extending downward from a front end of the connection part;
an upper can including a cover part disposed on a top surface of the accommodation part to cover the downward recess and a bonding part extending downward along an edge surface of the cover part and bonded to the bent part of the lower can; and
a gasket between the lower can and the upper can,
wherein a recessed lower insertion groove and a recessed upper insertion groove are respectively disposed in the bent part of the lower can and the bonding part of the upper can, the recessed lower insertion groove and the recessed upper insertion groove being in close contact with the gasket, respectively,
wherein the lower insertion groove and the upper insertion groove are disposed to be spaced apart from each other so as to be shifted in a vertical direction with respect to each other,
wherein the button-type secondary battery further comprises an insertion space between a first surface of the accommodation part and a surface of the bent part,
wherein the first surface of the accommodation part and the surface of the bent part face each other,
wherein the bent part and the bonding part are crimped by having the surface of the bent part and an outer surface of the bonding part directly pressed using the insertion space, and
wherein the surface of the bent part is inclined with respect to a portion of the accommodation part extending in the vertical direction so that the surface of the bent part is not parallel to the portion of the accommodation part extending in the vertical direction.

2. The button-type secondary battery of claim 1, wherein portions of the gasket are introduced into the lower insertion groove and the upper insertion groove by crimping the bent part of the lower can and the bonding part of the upper can to form a lower insertion protrusion and an upper insertion protrusion on a surface of the gasket,
wherein a contact area between the lower can and the gasket increases by the lower insertion protrusion, and
wherein a contact area between the upper can and the gasket increases by the upper insertion protrusion.

3. The button-type secondary battery of claim 1, wherein the lower insertion groove or the upper insertion groove has a triangular shape that gradually decreases in width toward a bottom.

4. The button-type secondary battery of claim 1, wherein the lower insertion groove or the upper insertion groove is provided in plurality, and
wherein the plurality of lower insertion grooves or the plurality of upper insertion grooves are connected to each other in a direction in which the lower can and the upper can are crimped.

5. The button-type secondary battery of claim 4, wherein the plurality of lower insertion grooves or the plurality of upper insertion grooves increase in size in the direction in which the lower can and the upper can are crimped.

6. The button-type secondary battery of claim 1, wherein a recessed connection insertion groove and a recessed cover insertion groove are defined in the connection part of the lower can and the cover part of the upper can, which are in close contact with the gasket, respectively, and wherein the connection insertion groove and the cover insertion groove are disposed to be spaced apart from each other so as to be shifted in a vertical direction with respect to each other.

7. The button-type secondary battery of claim 6, wherein portions of the gasket are introduced into the connection insertion groove and the cover insertion groove by crimping the connection part of the lower can and the cover part of the upper can to form a connection insertion protrusion and a cover insertion protrusion on a surface of the gasket, respectively, wherein a contact area between the lower can and the gasket increases by the connection insertion protrusion, and wherein a contact area between the upper can and the gasket increases by the cover insertion protrusion.

8. The button-type secondary battery of claim 1, wherein front ends of the bent part and the bonding part, which are bonded to each other with the gasket therebetween, are swaged so that the bent part is in close contact with a surface of the accommodation part.

* * * * *